Patented Nov. 6, 1934

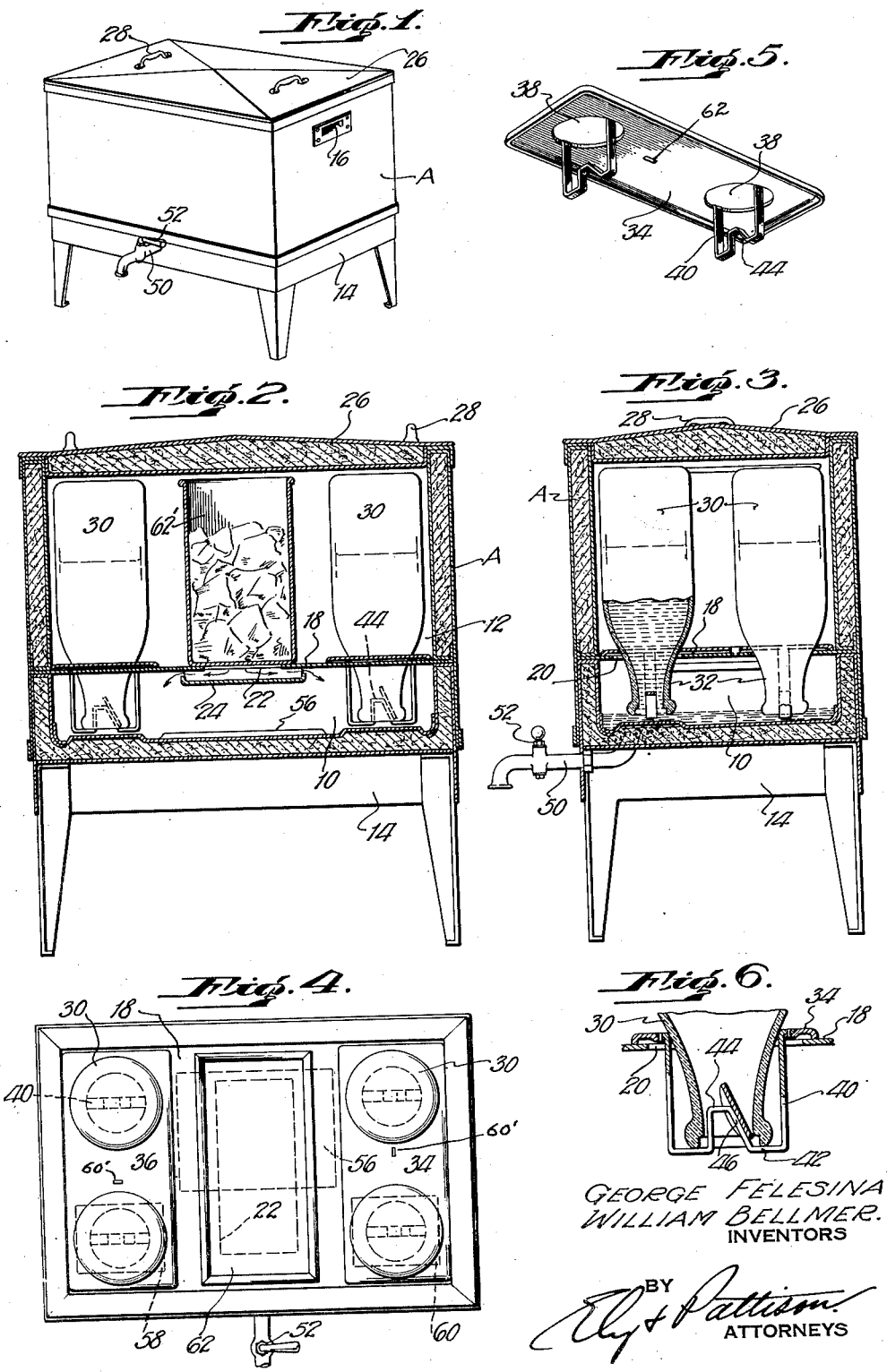

1,979,323

UNITED STATES PATENT OFFICE 1,979,323

LIQUID DISPENSING AND COOLING DEVICE

George Felesina, Carlstadt, N. J., and William Bellmer, Brooklyn, N. Y., assignors of one-fourth to Emil Jurgs and one-fourth to Christian Meier, both of New York, N. Y.

Application November 16, 1932, Serial No. 642,886

3 Claims. (Cl. 225—21)

The present invention relates to dispensing devices and more particularly it pertains to a means for dispensing in bulk, liquids contained in their original package of which milk in bottled form is one very good example.

A feature of the invention resides in the provision of novel means for supporting a plurality of separate or individual liquid containers such as milk bottles in inverted position in such a manner that the contents thereof may be discharged simultaneously from all of the containers.

Another feature of the invention resides in a novel construction whereby the liquid may be cooled or maintained at a low temperature until the several containers have been emptied.

Still a further feature resides in a novel means for supporting the containers in inverted position and for automatically opening the containers just prior to the final positioning thereof.

A still further feature of the invention resides in a novel construction by means of which a barometric seal of the discharge opening of the containers is obtained with a relatively small discharge of liquid from the containers.

A further feature of the invention resides in a novel construction whereby although the container supporting means or devices are bodily removable from the apparatus to facilitate the cleaning thereof, they cannot be replaced except in their proper position, which is an important feature in this particular apparatus as will be hereinafter brought out.

A further feature of the invention resides in a novel construction whereby the contents of the containers will be agitated periodically, which is an important feature when the device is employed for the dispensing of milk, since this construction prevents the separation of the milk into so-called skim milk and cream and insures each customer receiving the proportionate quantity of butter fat of the milk dispensed by the apparatus.

Other features of the invention relate to certain novel and improved constructions, arrangements and combinations of parts hereinafter described and particularly pointed out in the claims, the advantages of which will be readily understood and appreciated by those skilled in the art.

The invention will be clearly understood from the accompanying drawing illustrating the invention in its preferred form and the following detailed description of the constructions therein shown.

In the drawing,

Figure 1 is a perspective view of an apparatus constructed in accordance with the present invention, Figure 2 is a vertical sectional view of the apparatus, Figure 3 is a vertical sectional view of the apparatus, the view being taken at right angles to Figure 2, Figure 4 is a top plan view of the apparatus, the cover thereof being removed, Figure 5 is a detail perspective view of a portion of the apparatus, and;

Figure 6 is an enlarged fragmentary sectional view.

An apparatus constructed in accordance with the present invention consists of a housing A. The walls of this housing are preferably formed of heat insulating material in order that a relatively low temperature may be more readily maintained upon the interior thereof.

The housing A preferably comprises two sections or compartments 10 and 12. The compartment 10 is preferably mounted upon a suitable support 14 and the compartment 12 is constructed as to rest upon the upper edge of the side walls of the compartment 10 in such a manner as to be readily removable therefrom and this upper compartment is provided with handles 16 by means of which it may be manipulated. The lower compartment 10 is separated from the upper compartment 12 by means of a horizontal partition 10 which is preferably formed as a part of the lower compartment 10 and is rigidly carried thereby. This partition has a plurality of openings 20 preferably arranged one adjacent each corner thereof and centrally of the partition 18 it is provided with an opening 22. Immediately below the opening 22 and suitably secured to the end face of the partition 18 there is a deflector 24 which serves to deflect air in a lateral direction towards the other openings 20 heretofore mentioned. The upper compartment A is closed by a cover 26 provided with handles 28 by means of which it may be manipulated.

In the present illustration of the invention a device for dispensing milk from bottles in which it is shipped is disclosed and in such a device the bottles are inverted with the neck portion thereof positioned in the lower compartment 10 closely adjacent the bottom thereof in order that the milk as it is discharged from the bottles will upon rising in the compartment 10 form a barometric seal to prevent the complete discharge of the contents of the bottles in one operation.

In the drawing, the milk bottles are designated 30, the neck portions thereof being designated 32. These milk bottles are inverted within the housing with their neck portions positioned in the openings 20. In the present apparatus there is provision for four of such containers.

Means is provided for supporting these milk bottles 30 in their inverted position in proper relation to the bottom of the compartment 10, and as herein illustrated this means comprises plates 34 and 36. These plates 34 and 36 are adapted to rest upon the top wall of the partition 18 and they are provided with openings 38 which coincide with their respective openings in the partition and through which the necks of the bottles project or extend.

Carried by the plates 34 and 36 and extending through their respective openings in the partition 18 there are stirrup like members 40 which are adapted to receive the necks of the bottles with the discharge end of the bottle resting upon the bottom cross piece 42 of the member 40. Means is provided to automatically open the bottles by partially removing the closing cap thereof and this means herein consists of an upwardly extended portion 44 in the cross pieces 42 of each of the stirrup members. One side of this portion 44 is angularly disposed as at 46 and this angularly disposed portion prevents the complete removal of the closing cap or disk of the bottle but insures unseating the same sufficiently to permit of the ready flow of the contents therefrom.

Thus with the plates 34 and 36 in position it is only necessary to invert a bottle of milk, pass the neck portion thereof through the openings 38 and 20 until the closing cap engages the portion 44 of the stirrup member 40. Slight pressure then, upon the bottom of the bottle will effect an unseating of the closing cap and the bottle will be supported upon the cross piece 42 of the stirrup member 40.

The liquid is discharged from the compartment 10 through a suitable discharge pipe 50 provided with a control valve or faucet 52. In order that the liquid will pass freely to the discharge pipe 50 the bottom wall of the compartment 10 is inclined towards said discharge pipe as indicated in Figure 3.

Where the apparatus is used for the dispensing of milk by the glass or even in smaller quantities it is desirable that the contents of the lower compartment 10 should be equal to or but little greater than the amount to be discharged, that is, in the case of glass fulls, the compartment 10 should contain approximately one glass of milk which, when discharged therefrom, will break the barometric seals of the containers in order that the proper quantity may flow therefrom into the compartment 10 and the bottom of the compartment is preferably so constructed that immediately the discharged quantity is replaced the barometric seals of the several containers will be reestablished and further discharge of the contents of the container will be prevented until such time as the compartment 10 is again emptied. This breaking of the barometric seal of the several containers permits the entrance of air into the containers which passes upwardly through the contents thereof in the form of air bubbles completely agitating the same and preventing the permanent separation thereof into milk and cream of different butter fat content.

In order that the foregoing results may be accomplished the bottom wall of the compartment 10 is provided with a plurality of upstanding areas of which there are three designated 56, 58 and 60. The area 56 is centrally disposed to the rear of the bottom wall of the compartment 10 while the areas 58 and 60 are disposed beneath each of the forward containers. By this construction it will be seen that by varying the size of the areas 56 and 60 the compartment 10 may be made to contain any desired quantity of liquid to be discharged therefrom in a single operation. By this arrangement the compartment 10 will be substantially emptied by each operation of the apparatus, but immediately the discharge ceases the next quantity to be discharged will be measured as heretofore described.

In such a construction it is obvious that the tops of the areas 58 and 60 will be closer to the discharge openings of the forward containers than is the bottom wall of the compartment to the discharge openings of the rear containers. It will be noted by reference to Figure 4 that the plates 34 and 36 extend transversely of the housing or from front to rear thereof. The forward stirrup member 40 of each plate is, therefore, made shorter than the rear stirrup made thus preventing engagement of the discharge ends of the forward containers with the top of the raised areas 58 and 60 which engagement would prevent proper seating of the containers.

As heretofore stated the plates 34 and 36 are removable from the apparatus and it is, because of the foregoing, important that these plates always be properly replaced within the housing.

To insure the plates being properly positioned in the housing, the partition is provided with two upstanding pins 60' which are received in openings 62 in the plates. The arrangement of these pins and openings is such that unless the plates are properly positioned, the pins and openings will not register and consequently the plates will not properly seat upon the partition.

Above the opening 22 in the partition 18 there is mounted a receptacle 62'. This receptacle 62' is adapted to carry a cooling medium. Herein this cooling medium is illustrated as ice mounted in the receptacle 62 and the cooled air adjacent the opening 22 will be deflected laterally as indicated by the arrows in Figure 2 in the direction of that portion of the containers which extends below the partition 18.

From the foregoing it will be apparent that the present invention provides a new and novel liquid dispensing and cooling apparatus whereby liquids such as milk may be dispensed from bottles in relatively small quantities without requiring the continuous handling of the bottles, in which the apparatus is readily cleaned in order to maintain sanitary conditions thereof and which is of simple construction and of relatively cheap manufacture.

While the invention has been herein described in its preferred forms it is to be understood that it may be practiced in other forms particularly with respect to materials employed without departing from the spirit thereof and that the invention is not to be limited to the specific details of construction herein illustrated.

Having thus described the invention, what is claimed as new and what it is desired to secure by Letters Patent of the United States, is:

1. A device for cooling and dispensing liquids comprising a housing, a horizontal partition dividing said housing and having a plurality of openings therein, plates carried by said partition, container supporting means carried by said plates and depending through the openings of said partition, and means for preventing interchangeability of said plates.

2. A device for dispensing beverages comprising a housing having an inclined bottom wall, a partition dividing said housing into an upper and lower compartment, means for supporting a plurality of liquid containers in inverted upright position, and elevated areas on the bottom wall of said housing, said elevated areas being located adjacent the lower edge of the bottom wall of the housing, and directly below certain of said inverted containers.

3. A liquid cooling and dispensing device comprising a housing, a partition in said housing, said partition dividing the housing into upper and lower compartments and provided with a plurality of openings, a cooling medium mounted over one of the openings of said partition, and a cold air deflector mounted beneath said opening for deflecting cold air laterally of the lower compartment of the housing.

GEORGE FELESINA.
WILLIAM BELLMER.